(12) United States Patent
Takebayashi (10) Patent No.: US 10,361,435 B2
(45) Date of Patent: Jul. 23, 2019

(54) NONAQUEOUS ELECTROLYTE SECONDARY BATTERY

(71) Applicant: TOYOTA JIDOSHA KABUSHIKI KAISHA, Toyota-shi, Aichi-ken (JP)

(72) Inventor: Yoshitomo Takebayashi, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 329 days.

(21) Appl. No.: 15/184,482

(22) Filed: Jun. 16, 2016

(65) Prior Publication Data

US 2016/0372754 A1 Dec. 22, 2016

(30) Foreign Application Priority Data

Jun. 22, 2015 (JP) .................................. 2015-124944

(51) Int. Cl.
*H01M 4/62* (2006.01)
*H01M 4/131* (2010.01)
*H01M 10/0525* (2010.01)
*H01M 10/0569* (2010.01)

(52) U.S. Cl.
CPC ........... *H01M 4/625* (2013.01); *H01M 4/131* (2013.01); *H01M 4/62* (2013.01); *H01M 4/623* (2013.01); *H01M 10/0525* (2013.01); *H01M 10/0569* (2013.01); *H01M 2220/20* (2013.01); *H01M 2300/0037* (2013.01); *Y02E 60/122* (2013.01)

(58) Field of Classification Search
None
See application file for complete search history.

(56) References Cited

U.S. PATENT DOCUMENTS

| 5,807,645 | A | 9/1998 | Takeuchi et al. |
| 2008/0020283 | A1 | 1/2008 | Miyashiro et al. |
| 2010/0285369 | A1 | 11/2010 | Takahata |
| 2013/0130113 | A1* | 5/2013 | Takano ................. H01M 4/131 429/223 |
| 2015/0180036 | A1* | 6/2015 | Takebayashi .......... H01M 4/13 429/319 |
| 2016/0293936 | A1 | 10/2016 | Takebayashi |

FOREIGN PATENT DOCUMENTS

| CN | 101911345 A | 12/2010 |
| JP | H10-312811 A | 11/1998 |
| JP | 2000-058064 A | 2/2000 |
| JP | 2003-249224 A | 9/2003 |
| JP | 2009-170132 A | 7/2009 |
| JP | 2014-103098 A | 6/2014 |

(Continued)

*Primary Examiner* — Wyatt P McConnell
(74) *Attorney, Agent, or Firm* — Sughrue Mion, PLLC (57) ABSTRACT

Provided is a nonaqueous electrolyte secondary battery including a positive electrode, a negative electrode, and a nonaqueous electrolytic solution. The positive electrode includes a positive electrode current collector and a positive electrode active material layer that is formed on the positive electrode current collector. The positive electrode active material layer contains a positive electrode active material, an inorganic phosphate compound having ion conductivity, and a conductive material. The volatile component content in the conductive material is at least 0.15 mass % when measured according to JIS K 6221 (1982).

5 Claims, 3 Drawing Sheets

(56) References Cited

FOREIGN PATENT DOCUMENTS

| JP | 2014103098 | * | 6/2014 |
| JP | 2014-194901 A | | 10/2014 |
| JP | 2014-241279 A | | 12/2014 |
| JP | 2015-103332 A | | 6/2015 |
| KR | 10-2007-0034104 A | | 3/2007 |
| WO | 2009/117869 A1 | | 10/2009 |

* cited by examiner

NONAQUEOUS ELECTROLYTE SECONDARY BATTERY

INCORPORATION BY REFERENCE

The disclosure of Japanese Patent Application No. 2015-124944 filed on Jun. 22, 2015 including the specification, drawings and abstract is incorporated herein by reference in its entirety.

BACKGROUND OF THE INVENTION

1. Field of the Invention

The present invention relates to a nonaqueous electrolyte secondary battery.

2. Description of Related Art

In a nonaqueous electrolyte secondary battery, further improvement in energy density has been studied in an effort to improve performance. The improvement in energy density can be realized, for example, by increasing the action potential of a positive electrode to be higher than that in the related art. However, in a case where the action potential of a positive electrode is set to be higher than that of a general nonaqueous electrolyte secondary battery, for example, to be 4.3 V or higher vs. lithium metal, the durability of a battery may deteriorate significantly. Therefore, as a result of thorough investigation, the present inventors conceived a nonaqueous electrolyte secondary battery that includes an inorganic phosphate compound (a phosphate and/or a pyrophosphate) in a positive electrode (refer to Japanese Patent Application Publication No. 2014-103098 (JP 2014-103098 A)). According to the above-described configuration, the elution of a transition metal element from a positive electrode active material can be prevented, and the durability of a battery can be improved.

The present inventors repeated additional evaluation and investigation on the above-described technique. As a result, it was found that there is room for further improvement in a case where the above-described technique is applied to a battery which is used for an aspect where high-rate charging and discharging is repeated. That is, in general, the electron conductivity of an inorganic phosphate compound is extremely low. Therefore, when a positive electrode contains an inorganic phosphate compound, the durability is improved; on the contrary, the resistance may increase. As a result, input and output characteristics may deteriorate.

SUMMARY OF THE INVENTION

The invention provides a nonaqueous electrolyte secondary battery having satisfactory input and output characteristics and high durability at the same time.

According to the invention, there is provided a nonaqueous electrolyte secondary battery including a positive electrode, a negative electrode, and a nonaqueous electrolytic solution. The positive electrode includes a positive electrode current collector and a positive electrode active material layer that is formed on the positive electrode current collector. The positive electrode active material layer contains a positive electrode active material, an inorganic phosphate compound having ion conductivity, and a conductive material. A volatile component content in the conductive material is at least 0.15 mass %.

As described above, the electron conductivity of the inorganic phosphate compound is relatively low. In general, the volatile component contained in the conductive material is likely to cause an electrochemical side reaction to occur. Therefore, gas may be produced, and the capacity deterioration of a battery may increase. However, according to the investigation of the present inventors, by allowing an inorganic phosphate compound and a conductive material having a high volatile component content to be present together in a positive electrode, the above-described concerns can be resolved, and positive effects can be obtained. That is, the electron conductivity of the positive electrode can be improved, and the capacity deterioration can be suppressed. Accordingly, according to the above-described configuration, a battery having satisfactory input and output characteristics and high durability at the same time can be realized.

"Volatile component content" described in this specification is a value measured according to JIS K 6221 (1982). Specifically, first, a measurement sample (conductive material) is heated and dried at 105° C. to 110° C. for 2 hours. Next, the dried measurement sample is heated and fired in a vacuum of 3 torr at 950° C. for 10 minutes. A volatile component content refers to a value which is calculated from a difference (decrease in amount) between the mass values before and after heating and firing according to the following expression.

$$\text{Volatile Component Content (\%)} = [(\text{Mass before Heating and Firing}) - (\text{Mass after Heating and Firing})]/(\text{Mass before Heating and Firing}) \times 100$$

The volatile component is, for example, a hydroxyl group or a carboxyl group.

In an aspect of the nonaqueous electrolyte secondary battery disclosed herein, the volatile component content in the conductive material may be 1.02 mass % or lower. By suppressing the volatile component to be low, the durability can be maintained and improved. As a result, the effects of the invention can be exhibited at a higher level.

In an aspect of the nonaqueous electrolyte secondary battery disclosed herein, in a case where a mass ratio of the volatile component content to the total solid content of the positive electrode active material layer is represented by Cv (mass %), and in a case where a mass ratio of a content of the inorganic phosphate compound to the total solid content of the positive electrode active material layer is represented by Cp (mass %), a ratio of Cp to Cv (Cp/Cv) may be 36 to 357. By controlling the ratio of the content of the inorganic phosphate to the volatile component content in the conductive material to be in the above-described range, the suppressing of the resistance and the maintenance and improvement of the durability can be realized at a higher level. Accordingly, the effects of the invention can be exhibited at a higher level.

In an aspect of the nonaqueous electrolyte secondary battery disclosed herein, a content ratio of the inorganic phosphate compound to 100 parts by mass of the positive electrode active material may be 1 part by mass to 10 parts by mass. By suppressing the content ratio of the inorganic phosphate compound to be as low as possible, the resistance of the positive electrode can be further reduced. Accordingly, more satisfactory input and output characteristics can be realized while maintaining high durability.

The volatile component may be a functional group component provided on a surface of the conductive material, and the functional group component may be a hydrophilic functional group or a polar group. It is considered that the high-volatility conductive material has high affinity to a solvent, a binder, and a positive electrode active material. Therefore, an effect of improving a dispersed state of the conductive material in the positive electrode active material layer or an effect of improving the adhesion between the conductive material and the positive electrode active material is obtained.

In an aspect of the nonaqueous electrolyte secondary battery disclosed herein, the volatile component content in the conductive material may be at least 0.24 mass % when measured according to JIS K 6221 (1982).

In an aspect of the nonaqueous electrolyte secondary battery disclosed herein, the volatile component content in the conductive material may be at least 0.35 mass % when measured according to JIS K 6221 (1982).

In an aspect of the nonaqueous electrolyte secondary battery disclosed herein, the volatile component may contain acetylene black.

As described above, the nonaqueous electrolyte secondary battery disclosed herein (for example, a lithium ion secondary battery) has satisfactory input and output characteristics and high durability at the same time. Accordingly, due to the above characteristics, the nonaqueous electrolyte secondary battery can be suitably used as, for example, a power source (power supply) for driving a vehicle-mounted motor.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A preferred embodiment of the invention will be described below. Matters (for example, a configuration of a negative electrode or a nonaqueous electrolytic solution or general techniques relating to the construction of a battery) necessary to practice this invention other than those (for example, a configuration of a positive electrode) specifically referred to in this description may be understood as design matters based on the related art in the pertinent field for a person of ordinary skill in the art. The invention can be practiced based on the contents disclosed in this specification and common technical knowledge in the pertinent field.

A nonaqueous electrolyte secondary battery disclosed herein includes a positive electrode, a negative electrode, and a nonaqueous electrolytic solution. Hereinafter, the respective components will be sequentially described.

<<Positive Electrode>>

The positive electrode includes: a positive electrode current collector; and a positive electrode active material layer that is formed on the positive electrode current collector. As the positive electrode current collector, a conductive member formed of highly conductive metal (for example, aluminum or nickel) is preferably used. The positive electrode active material layer contains a positive electrode active material (a), an inorganic phosphate compound (b) having ion conductivity, and a conductive material (c) having at least 0.15 mass % of a volatile component (herein after, also referred to as "high-volatility conductive material").

By the positive electrode active material layer containing (b) the inorganic phosphate compound, at least one of the following effects (1) to (3) is exhibited: (1) a protective film containing a component derived from the inorganic phosphate compound (for example, a film containing LiF) is formed on a surface of the positive electrode active material through initial charging and discharging; (2) the oxidative decomposition of a nonaqueous electrolytic solution is suppressed; and (3) an acid (for example, hydrofluoric acid) produced by the oxidative decomposition of a nonaqueous electrolytic solution (for example, a supporting electrolyte) is trapped by the inorganic phosphate compound to alleviate the acidity of the nonaqueous electrolytic solution. As a result, the elution of a constituent metal element (in particular, a transition metal element) from the positive electrode active material is reduced, and the deterioration of the positive electrode active material is suppressed.

By the positive electrode active material layer containing the high-volatility conductive material (c), a problem caused by the addition of the inorganic phosphate compound (b) is compensated for, and the conductivity of the positive electrode can be further improved. The present inventors presume the reason for this to be as follows: the dispersibility of the conductive material is improved; and the conductive material is more strongly adsorbed to the surface of the positive electrode active material. That is, the positive electrode active material layer is typically formed in the following procedure. First, constituent materials of the positive electrode active material layer and a solvent are mixed with each other to prepare a slurry. Next, the prepared slurry is applied to the positive electrode current collector. By drying the slurry to remove the solvent component therefrom, the positive electrode active material layer is formed. Here, the volatile component contained in the conductive material is a functional group component provided on a surface of the conductive material. For example, the functional group component is a hydrophilic functional group (or a polar group) such as a hydroxyl group or a carboxyl group. Accordingly, it is considered that the high-volatility conductive material has high affinity to a solvent, a binder, and a positive electrode active material. Therefore, it is considered that an effect of improving a dispersed state of the conductive material in the positive electrode active material layer or an effect of improving the adhesion between the conductive material and the positive electrode active material is obtained.

Further, as described above, in a case where the high-volatility conductive material (c) is used alone, a problem may occur in an electrochemical side reaction of the volatile component. However, by using the inorganic phosphate compound (b) and the high-volatility conductive material (c) in combination, this problem can be compensated for. Only the advantageous effects of the inorganic phosphate compound (b) and the high-volatility conductive material (c) can be utilized. Accordingly, a battery having low resistance and high durability can be realized.

As the positive electrode active material (a), one kind or two or more kinds selected from various known materials, which can be used as a positive electrode active material of a general nonaqueous electrolyte secondary battery, can be used. Preferable examples of the positive electrode active material include a lithium composite oxide containing lithium and at least one transition metal element.

In a preferable aspect, the positive electrode active material contains a lithium composite oxide having an action potential of 4.3 V or higher, preferably, 4.5 V or higher vs. lithium metal. As a result, the action potential of the positive electrode can be set to be high, and a battery having high energy density can be realized. Examples of the lithium composite oxide include a lithium nickel manganese composite oxide having a spinel structure represented by the following formula (I).

$$Li_x(Ni_yMn_{2-y-z}M_z)O_{4+\alpha}A_q.$$

The formula (I) may contain or may not contain M. When M is contained, M may represent an arbitrary transition metal element other than Ni and Mn or a typical metal element (for example, one element or two or more elements selected from Ti, V, Cr, Fe, Co, Cu, Zn, Al, and W). Alternatively, M may represent a metalloid element (for example, one element or two or more elements selected from B, Si, and Ge) or a non-metal element. By doping M with a different element other than Li, Ni, and Mn, high structural stability can be realized. In particular, it is preferable that M contains Ti and Fe. According to the investigation of the present inventors, by the formula (I) containing Ti and Fe, thermal stability is improved. Accordingly, higher durability (for example, high-temperature cycle characteristics) can be realized.

In the formula (I), x, y, and z are values which satisfy $0.8 \leq x \leq 1.2$, $0 < y$, $0 \leq z$, and $y+z<2$ (typically, $y+z \leq 1$). $\alpha$ is a value which is determined so as to satisfy a charge neutral condition when $-0.2 \leq \alpha \leq 0.2$. q satisfies $0 \leq q \leq 1$. In a preferable aspect, y satisfies $0.2 \leq y \leq 1.0$ (more preferably $0.4 \leq y \leq 0.6$; for example, $0.45 \leq y \leq 0.55$). As a result, the effects of the invention can be realized at a higher level. In another preferable aspect, z satisfies $0 \leq z \leq 1.0$ (for example, $0 \leq z \leq 0.3$; preferably, $0.05 \leq z \leq 0.2$). As a result, the effects of the invention can be realized at a higher level. In another preferable aspect, q satisfies $0 \leq q \leq 1$. In a case where q represents a value more than 0, A represents F or Cl.

Specific examples of the lithium composite oxide represented by the formula (I) include $LiNi_{0.5}Mn_{1.5}O_4$, $LiNi_{0.5}Mn_{1.45}Ti_{0.05}O_4$, $LiNi_{0.45}Fe_{0.05}Mn_{1.5}O_4$, $LiNi_{0.45}Fe_{0.05}Mn_{1.45}Ti_{0.05}O_4$, and $LiNi_{0.475}Fe_{0.025}Mn_{1.475}Ti_{0.025}O_4$.

A proportion of Mn in the positive electrode active material may be about 30 mol % or higher (for example, 50 mol % or higher) with respect to 100 mol % of the total amount of all the transition metals in the positive electrode active material. As the potential of the positive electrode increases, Mn is more likely to be eluted. Therefore, for example, in a case where the positive electrode active material contains Mn in the above-described proportion, it is preferable that the technique disclosed herein is applied. That is, in a battery including the positive electrode active material which contains Mn in the above-described proportion, the above-described effect of improving durability is more suitably exhibited.

The form of the positive electrode active material is not particularly limited but, typically, is a particulate or powder form. The average particle size of the positive electrode active material in a particulate form is preferably about 20 µm or less (typically, 1 µm to 20 µm; for example, about 5 µm to 15 µm). In this specification, "average particle size" refers to a particle size (also referred to as "$D_{50}$" or "median size") corresponding to a cumulative frequency of 50 vol % in order from the smallest particle size in a volume particle size distribution based on a general laser diffraction laser scattering method.

A ratio of the mass of the positive electrode active material to the total mass (total solid content) of the positive electrode active material layer is not particularly limited but is preferably about 50 mass % or higher (typically, 80 mass % or higher; for example, 95 mass % or lower). As a result, high energy density and high output density can be simultaneously realized at a high level.

As the inorganic phosphate compound, a compound having ion conductivity can be used without any particular limitation. Preferable examples of the inorganic phosphate compound include a known inorganic solid electrolyte material which can function as an electrolyte material of an all-solid-state battery. In a preferable aspect, the inorganic phosphate compound contains at least one selected from an alkali metal element, a Group 2 element (an alkali earth metal element in a broad sense), and a hydrogen atom. In another preferable aspect, the inorganic phosphate compound contains at least one selected from a phosphate and a pyrophosphate (diphosphate). Specific examples include: a phosphoric acid-based ion conductor such as $Li_3PO_4$, $LiH_2PO_4$, $Na_3PO_4$, $K_3PO_4$, $Mg_3(PO_4)_2$, $Ca_3(PO_4)_2$, or LiPON (lithium phosphorus oxynitride); a NASICON type ion conductor such as $Li_{1.5}Al_{0.5}Ge_{1.5}(PO_4)_3$; a perovskite type ion conductor; and a thio-LISICON type ion conductor. Among these, $Li_3PO_4$ is preferable.

The form of the inorganic phosphate compound is not particularly limited but, typically, is a particulate or powder form. The average particle size of the inorganic phosphate compound in a particulate form is equal to or less than the average particle size of the positive electrode active material but is preferably about 20 µm or less (typically, 1 µm to 10 µm; for example, about 1 µm to 5 µm). When the average particle size of the inorganic phosphate compound is in the above-described range, the inorganic phosphate compound is likely to fill gaps between particles of the positive electrode active material. As a result, a conductive path between the particles of the positive electrode active material can be secured and the resistance of the positive electrode can be reduced at a high level. Further, when the positive electrode active material and the inorganic phosphate compound are adjacent to each other, the above-described acid trapping effect (3) can be exhibited more favorably. Accordingly, the deterioration of the positive electrode active material can be suppressed at a higher level.

A content ratio of the inorganic phosphate compound to 100 parts by mass of the positive electrode active material is not particularly limited but is preferably about 0.1 parts by mass to 15 parts by mass (typically, 1 part by mass to 10 parts by mass; for example, 1 part by mass to 3 parts by mass). A ratio of the mass of the inorganic phosphate compound to the total mass (total solid content) of the positive electrode active material layer is not particularly limited, but is preferably about 0.1 mass % or higher (typically, 0.5 mass % or higher; for example, 1 mass % or higher) and is preferably about 15 mass % or lower (typically, 10 mass % or lower; for example, 3 mass % or lower). By controlling the content ratio of the inorganic phosphate compound to be the predetermined value or higher, the deterioration of the positive electrode active material can be accurately suppressed, and the effect of improving durability can be fully exhibited. By controlling the content ratio of the inorganic phosphate compound to be the predetermined value or lower, the resistance of the positive electrode can be reduced at a higher level, and the effect of improving input and output characteristics can be fully exhibited.

The high-volatility conductive material (c) contains at least 0.15 mass % of a volatile component. The volatile component content is preferably 0.24 mass % or higher (for example, 0.35 mass % or higher). Typically, the high-volatility conductive material has more functional groups on a surface thereof than a general conductive material. According to the investigation of the present inventors, the high-volatility conductive material has high affinity to a binder, a positive electrode active material, and a solvent used during the formation of the positive electrode active material layer. Accordingly, the high-volatility conductive material has an effect of causing a better conductive path to be formed between the particles of the positive electrode active material as compared to a conductive material (low-volatility conductive material) containing lower than 0.15 mass % of a volatile component. As a result, in the positive electrode including the high-volatility conductive material, the resistance can be reduced. The upper limit value of the volatile component content is not particularly limited but is typically 1.02 mass % or lower (for example, 0.78 mass % or lower). As a result, higher durability can be realized.

Japanese Patent Application Publication No. 2014-194901 (JP 2014-194901 A) discloses a carbon black for a lithium ion secondary battery in which the average particle size of primary particles is 20 nm or less and in which a volatile component content is 0.20% or lower. As described paragraph [0014] and Examples in JP 2014-194901 A, in a case where a conductive material having a high volatile component content is used alone (in other words, in a case where the conductive material is not used in combination with the inorganic phosphate compound), the above-described side reaction problem may become severe. Therefore, in general, a conductive material having a low volatile component content is preferable for use in a battery.

In a preferable aspect, in a case where a mass ratio of the volatile component content to the total solid content of the positive electrode active material layer is represented by Cv (mass %), and in a case where a mass ratio of a content of the inorganic phosphate compound (b) to the total solid content of the positive electrode active material layer is represented by Cp (mass %), a ratio of Cp to Cv (Cp/Cv) is about 10 or higher (preferably, 30 or higher, more preferably 36 or higher; for example, 48 or higher) and is about 500 or lower (preferably, 400 or lower, more preferably 357 or lower; for example, 250 or lower). Within the above-described range, the volatile component and the inorganic phosphate compound contained in the conductive material are more well-balanced. As a result, a problem caused by an increase in the volatile component content is compensated for, and the effects of the invention can be exhibited at a high level. Cv described above can be calculated from the following expression.

$Cv$ (mass %)=Mass Ratio (mass %) of Content of Conductive Material to Total Solid Content of Positive Electrode Active Material Layer×Volatile Component Content (mass %) in Conductive Material Measured According to JIS $K$ 6221 (1982)/100

The volatile component content in the conductive material can be adjusted, for example, using the following methods including: a method (oxidation) of heating and firing a conductive material in an oxygen atmosphere; a method of mixing a conductive material and a functionalizing agent (for example, a compound having an oxygen-containing group) with each other and heating and firing the obtained mixture; and a method (plasma treatment) of irradiating a conductive material with oxygen plasma.

Characteristics (for example, particle size or specific surface area) of the high-volatility conductive material other than the volatile component content is not particularly limited. In general, as the particle size of primary particles in the conductive material decreases, the specific surface area increases. Therefore, the contact area between the positive electrode active material and the conductive material increases, which is advantageous for forming a conductive path. On the other hand, a conductive material having a large specific surface area is likely to be bulky. Therefore, the energy density is likely to decrease, and the reactivity with the nonaqueous electrolytic solution is likely to increase. The reason for this is as follows. The average particle size of primary particles of the high-volatility conductive material is preferably about 1 nm to 200 nm (typically, 10 nm to 100 nm; for example, 30 nm to 50 nm). The specific surface area of the high-volatility conductive material is preferably about 25 $m^2$/g to 1000 $m^2$/g (typically, 50 $m^2$/g to 500 $m^2$/g; for example, 50 $m^2$/g to 200 $m^2$/g). "The average particle size of primary particles" refers to an arithmetic mean value of particle sizes which are obtained by observing 30 or more (for example, 30 to 100) primary particles with an electron microscope (any one of a scanning electron microscope and a transmission electron microscope may be used). "Specific surface area of an active material" refers to a value obtained by analyzing the surface area of an active material using a BET method (for example, one-point BET method), the surface area being measured using a nitrogen adsorption method.

As the high-volatility conductive material, one kind or two or more kinds selected from various known materials, which can be used as a conductive material of a general nonaqueous electrolyte secondary battery, can be used. Preferable examples of the high-volatility conductive material include a carbon material such as carbon black (for example, acetylene black, Ketjen black, furnace black, channel black, lamp black, or thermal black), activated carbon, graphite, or carbon fiber. Among these, carbon black is preferable from the viewpoint of suitably realizing the above-described characteristics (the volatile component content, and the average particle size and specific surface area of the primary particles). In particular, acetylene black is preferable.

A ratio of the mass of the high-volatility conductive material to the total mass (total solid content) of the positive electrode active material layer is not particularly limited but is preferably about 20 mass % or lower (typically, 15 mass % or lower; for example, 10 mass % or lower; preferably, 8 mass % or lower). By controlling the content ratio of the conductive material to be the predetermined value or lower, the side reaction during charging and discharging can be further suppressed. Accordingly, the deterioration of the positive electrode active material can be suppressed at a high level, and the effect of improving durability can be fully exhibited. By suppressing the content ratio of the conductive material to be low, an effect of improving energy density can also be obtained. The lower limit of the content ratio of the high-volatility conductive material is preferably about 0.1 mass % or higher (typically, 1 mass % or higher; for example, 5 mass % or higher). By controlling the content ratio of the conductive material to be the predetermined value or higher, the electron conductivity of the positive electrode active material layer can be further improved. Accordingly, the resistance of the positive electrode can be reduced at a high level, and the effect of improving input and output characteristics can be fully exhibited.

The positive electrode active material layer optionally contains one optional component or two or more optional components other than the positive electrode active material layer (a), the inorganic phosphate compound (b), and the conductive material (c). Typical examples of the optional component include a binder. Examples of the binder include: vinyl halide resins such as polyvinylidene fluoride (PVdF); and polyalkylene oxides such as polyethylene oxide (PEO). The positive electrode active material layer may further contain various additives (for example, an inorganic compound that produces gas during overcharging, a dispersant, or a thickener) within a range where the effects of the invention do not significantly deteriorate. In a case where the binder is used, a ratio of the mass of the binder to the total mass (total solid content) of the positive electrode active material layer is not particularly limited but is typically 0.1 mass % to 10 mass % (for example, 1 mass % to 5 mass %). As a result, the mechanical strength (shape retaining ability) of the positive electrode can be made more accurate.

In a preferable aspect, the open-circuit voltage (OCV) of the positive electrode is 4.3 V or higher, preferably 4.5 V or higher, more preferably 4.6 V or higher, and still more preferably 4.7 V or higher vs. lithium metal. By increasing OCV of the positive electrode, a potential difference (voltage) between the positive and negative electrodes can be made to be large, and a battery having high energy density can be realized. The OCV of the positive electrode may be about 7.0 V or lower (typically, 6.0 V or lower; for example, 5.5 V or lower) vs. lithium metal.

The open-circuit voltage of the positive electrode active material can be measured using, for example, the following method. First, a three-electrode cell is constructed using a positive electrode as a working electrode (WE), lithium metal as a counter electrode (CE), lithium metal as a reference electrode (RE), and a nonaqueous electrolytic solution. Next, the three-electrode cell is adjusted in a state of charge (SOC) range of 0% to 100% based on the theoretical capacity of the three-electrode cell. The adjustment of the SOC can be made by charging a portion between WE and CE, for example, using a general charging-discharging device or a potentiostat. The voltage between WE and RE in each SOC is measured and can be considered as the open-circuit voltage (vs. Li/Li$^+$).

<<Negative Electrode>>

Typically, the negative electrode includes: a negative electrode current collector; and a negative electrode active material layer that is formed on the negative electrode current collector. As the negative electrode current collector, a conductive member formed of highly conductive metal (for example, copper or nickel) is preferably used.

The negative electrode active material layer contains a negative electrode active material. As the negative electrode active material, one kind or two or more kinds selected from various known materials, which can be used as a negative electrode active material of a general nonaqueous electrolyte secondary battery, can be used. Preferable examples of the negative electrode active material include graphite, non-graphitizable carbon (hard carbon), graphitizable carbon (soft carbon), and a carbon material having a combination thereof (for example, graphite having a surface coated with amorphous carbon). Among these, a graphite-based carbon material is preferable in which graphite accounts for 50 mass % or higher in the total mass of the negative electrode active material.

The negative electrode active material layer optionally contains one optional component or two or more optional components other than the negative electrode active material. Typical examples of the optional component include a binder. Preferable examples of the binder include: rubbers such as styrene-butadiene rubber (SBR); fluororesins such as polyvinylidene fluoride (PVdF) or polytetrafluoroethylene (PTFE); and cellulose polymers such as carboxymethyl cellulose (CMC). The negative electrode active material layer optionally further contains various additives (for example, a dispersant, a thickener, and a conductive material).

<<Nonaqueous Electrolytic Solution>>

The nonaqueous electrolytic solution is liquid at normal temperature (for example, 25° C.). It is preferable that the nonaqueous electrolytic solution is typically liquid in an operating temperature range (for example, −20° C. to +60° C.) of the battery. In the nonaqueous electrolytic solution, it is preferable that a nonaqueous solvent contains a supporting electrolyte. As the supporting electrolyte, one kind or two or more kinds selected from various known compounds, which can be used as a supporting electrolyte of a general non-aqueous electrolyte secondary battery, can be appropriately adopted. For example, in a case where lithium ions (Li$^+$) are used as the charge carriers, examples of the supporting electrolyte include lithium salts such as LiPF$_6$, LiBF$_4$, LiClO$_4$, and Li(CF$_3$SO$_2$)$_2$N. Among these, LiPF$_6$ is preferable. The concentration of the supporting electrolyte is preferably 0.7 mol/L to 1.3 mol/L.

As the nonaqueous solvent, one kind or two or more kinds selected from various organic solvents, which can be used as a nonaqueous solvent of a general nonaqueous electrolyte secondary battery, can be appropriately adopted. Specific examples of the nonaqueous solvent include carbonates, ethers, esters, nitriles, sulfones, and lactones. Among these, a solvent having satisfactory oxidation resistance (that is, a high oxidative decomposition potential) is preferable. Preferable examples of the solvent include a fluorine-based solvent (fluorine-containing nonaqueous solvent). As the fluorine-based solvent, an organic solvent having a chemical structure in which at least one hydrogen atom of an organic solvent not containing fluorine is substituted with a fluorine atom can be considered.

Among the fluorine-based solvents, fluorinated carbonate is particularly preferable. By the nonaqueous electrolytic solution containing fluorinated carbonate, the oxidation potential of the nonaqueous electrolytic solution can be improved more favorably. As a result, even in a case where the positive electrode potential increases (for example, 4.3 V or higher (vs. Li/Li$^+$)), the oxidative decomposition of the nonaqueous electrolytic solution can be significantly suppressed. In a preferable aspect, a ratio of the mass of the fluorine-based solvent to the total mass of the nonaqueous solvent is about 10 mass % or higher (for example, 30 mass % to 100 mass %; preferably 50 mass % to 100 mass %). For example, the ratio may be 100 mass % (for example, 99 mass % or higher).

Examples of the fluorinated carbonate include: fluorinated cyclic carbonates such as monofluoroethylene carbonate (MFEC) and difluoroethylene carbonate (DFEC); and fluorinated chain carbonates such as fluorodimethyl carbonate, difluorodimethyl carbonate, trifluorodimethyl carbonate (TFDMC), and fluoromethyl difluoromethyl carbonate. In a preferable aspect, the nonaqueous electrolytic solution contains at least one fluorinated chain carbonate and at least one fluorinated cyclic carbonate. The fluorinated chain carbonate (preferably, fluorinated linear carbonate) is effective for suppressing the viscosity of the nonaqueous electrolytic solution to be low. The fluorinated cyclic carbonate is effective for improving the ion conductivity of the nonaqueous electrolytic solution. A mixing ratio of the fluorinated chain carbonate to the fluorinated cyclic carbonate is preferably about 1:3 to 3:1 (for example, about 1:1). As a result, the above-described characteristics can be made to be well-balanced at a high level.

The nonaqueous electrolytic solution may appropriately contain a component other than the nonaqueous solvent and the supporting electrolyte. Examples of the optional component include: a film forming agent such as lithium bis(oxalato)borate (LiBOB), vinylene carbonate (VC), vinyl ethylene carbonate (VEC), or fluoroethylene carbonate (FEC); a compound which may produce gas during overcharging, such as biphenyl (BP) or cyclohexylbenzene (CHB); and a viscosity modifier.

<<Embodiment of Nonaqueous Electrolyte Secondary Battery>>

Figure 1:
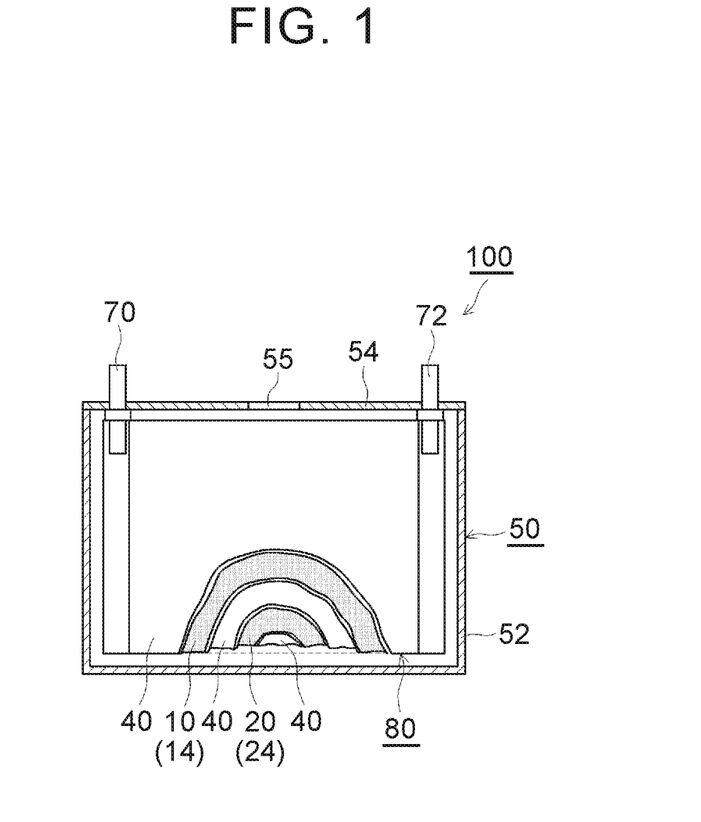
FIG. 1 is a longitudinal sectional view schematically showing a nonaqueous electrolyte secondary battery according to an embodiment of the invention.

Although not particularly limited thereto, a schematic configuration of a nonaqueous electrolyte secondary battery according to an embodiment of the invention will be described in detail using a nonaqueous electrolyte secondary battery (single cell), which is schematically shown in FIG. 1, as an example. In the following drawings, parts or portions having the same function are represented by the same reference numerals, and the repeated description will not be made or will be simplified. In each drawing, a dimensional relationship (for example, length, width, or thickness) does not necessarily reflect the actual dimensional relationship.

FIG. 1 is a longitudinal sectional view showing a nonaqueous electrolyte secondary battery (single cell) 100 according to an embodiment of the invention. The nonaqueous electrolyte secondary battery 100 includes: a flat wound electrode body 80; a nonaqueous electrolytic solution (not shown); and a flat cuboid battery case 50 that accommodates the wound electrode body 80 and the nonaqueous electrolytic solution. The battery case 50 includes: a flat cuboid battery case body 52 having an open upper end; and a lid 54 that covers the opening. A material of the battery case 50 may be a light-weight metal such as aluminum. A shape of the battery case is not particularly limited and may be, for example, a cuboid shape or a cylindrical shape. On a top surface (that is, the lid 54) of the battery case 50, a positive electrode terminal 70 and a negative electrode terminal 72 are provided for external connection. A portion of the positive electrode terminal 70, the negative electrode terminal 72 protrudes toward the surface side of the lid 54. The positive electrode terminal 70 is electrically connected to the positive electrode sheet 10 of the wound electrode body 80 on the battery case 50 side. The negative electrode terminal 72 is electrically connected to the negative electrode sheet 20 of the wound electrode body 80 on the battery case 50 side. The lid 54 further includes a safety valve 55 for discharging gas, produced from the inside of the battery case 50, to the outside of the battery case 50.

The wound electrode body 80 includes an elongated positive electrode sheet 10 and an elongated negative electrode sheet 20. The positive electrode sheet 10 includes: an elongated positive electrode current collector; and a positive electrode active material layer 14 that is formed on a surface (typically, on both surfaces) of the positive electrode current collector in the longitudinal direction. The negative electrode sheet 20 includes: an elongated negative electrode current collector; and a negative electrode active material layer 24 that is formed on a surface (typically, on both surfaces) of the negative electrode current collector in the longitudinal direction. The wound electrode body 80 includes two elongated separator sheets 40. The positive electrode sheet 10 (positive electrode active material layer 14) and the negative electrode sheet 20 (negative electrode active material layer 24) are insulated by the separator sheets 40. A material of the separator sheets 40 may be a resin such as polyethylene (PE), polypropylene (PP), polyester, cellulose, or polyamide. For example, in order to prevent internal short-circuiting, a porous heat resistance layer containing inorganic compound particles (inorganic filler) may be provided on a surface of the separator sheet 40. This wound electrode body 80 may be flat and, for example, can adopt an appropriate shape and an appropriate configuration according to the shape and intended use of the battery.

<<<Use of Nonaqueous Electrolyte Secondary Battery>>

The nonaqueous electrolyte secondary battery disclosed herein exhibit satisfactory input and output characteristics and high durability at the same time. The nonaqueous electrolyte secondary battery disclosed herein can be used for various applications. Due to the above-described characteristics, the nonaqueous electrolyte secondary battery can be suitably used for an application where satisfactory input and output densities and high durability are required at the same time. Examples of the application include a power source (power supply) for driving a motor mounted in a vehicle such as a plug-in hybrid vehicle, a hybrid vehicle, or an electric vehicle.

Hereinafter, several examples relating to the invention will be described, but the examples are not intended to limit the invention.

[I. Investigation Relating to Volatile Component of Conductive Material]

<Preparation of Positive Electrodes(Examples 1 to 5, Reference Examples 1 and 2)>

As a positive electrode active material, NiMn spinel ($LiNi_{0.5}Mn_{1.5}O_4$, Ti or Fe-doped product) having an average particle size of 7 μm was prepared. As an inorganic phosphate compound, commercially available $Li_3PO_4$ having an average particle size of 3 μm was prepared. As conductive materials, seven kinds of acetylene black having a volatile component content of 0.01 mass % to 1.02 mass % in the conductive materials were prepared. The volatile component content in acetylene black which was generally used was about 0.01 mass %. First, NiMn spinel and $Li_3PO_4$ described above were mixed with each other at a mass ratio of 100:3. The mixture; acetylene black (AB) having a volatile component content as shown in Table 1; and polyvinylidene fluoride (PVdF) as a binder were weighed such that a mass ratio (($LiNi_{0.5}Mn_{1.5}O_4+Li_3PO_4$):AB:PVdF) thereof was 89:8:3. These weighed materials were mixed with N-methyl-2-pyrrolidone (solvent; NMP) to prepare a slurry. This slurry for forming a positive electrode active material layer was applied to an aluminum foil (positive electrode current collector) and was dried. As a result, a positive electrode including a positive electrode active material layer that is formed on the positive electrode current collector was obtained.

<Preparation of Positive Electrode (Reference Examples 3 to 7)>

In Reference Examples 3 to 7, positive electrodes were prepared without using $Li_3PO_4$. That is, the above-described NiMn spinel; acetylene black (AB) having a volatile component content as shown in Table 1; and polyvinylidene fluoride (PVdF) were weighed such that a mass ratio ($LiNi_{0.5}Mn_{1.5}O_4$:AB:PVdF) thereof was 89:8:3. These weighed materials were mixed with N-methyl-2-pyrrolidone (solvent; NMP) to prepare a slurry. This slurry for forming a positive electrode active material layer was applied to an aluminum foil (positive electrode current collector) and was dried. As a result, a positive electrode including a positive electrode active material layer that is formed on the positive electrode current collector was obtained.

<Preparation of Negative Electrode>

Graphite (C) as a negative electrode active material; carboxymethyl cellulose (CMC) as a binder; styrene-butadiene rubber (SBR) were weighed such that a mass ratio (C:CMC:SBR) thereof was 98:1:1. The weighed materials were mixed with ion exchange water (solvent) to prepare a slurry. This slurry for forming a negative electrode active material layer was applied to a copper foil (negative electrode current collector) and was dried. As a result, a negative electrode including a negative electrode active material layer that is formed on the negative electrode current collector was obtained.

<Construction of Nonaqueous Electrolyte Secondary Battery>

The positive electrode and the negative electrode prepared as described above were laminated with a separator interposed therebetween to prepare an electrode body. As the separator, a porous film having a three-layer structure of polypropylene (PP)/polyethylene (PE)/polypropylene (PP) was used. In order to prepare a nonaqueous electrolytic solution, $LiPF_6$ as a supporting electrolyte was dissolved in a mixed solvent such that the concentration thereof was 1.0 mol/L, the mixed solvent containing monofluoroethylene carbonate (MFEC) as a cyclic carbonate and trifluorodimethyl carbonate (TFDMC) as a chain carbonate at a volume ratio of 50:50. The electrode body and the nonaqueous electrolytic solution which were prepared as described above were sealed into a laminate battery case. In this way, lithium ion secondary batteries (Examples 1 to 5 and Reference Examples 1 to 7) were constructed.

<Conditioning Treatment>

The following charging-discharging operations (1) and (2) were repeatedly performed on the constructed batteries in 3 cycles in a temperature environment of 25° C. to perform a conditioning treatment. (1) The batteries were charged to 4.9 V at a constant current (CC) at a rate of 1/3 C, and then the operation was stopped for 10 minutes. (2) The batteries were discharged to 3.5 V at a constant current (CC) at a rate of 1/3 C, and then the operation was stopped for 10 minutes.

<Initial Resistance>

Figure 2:
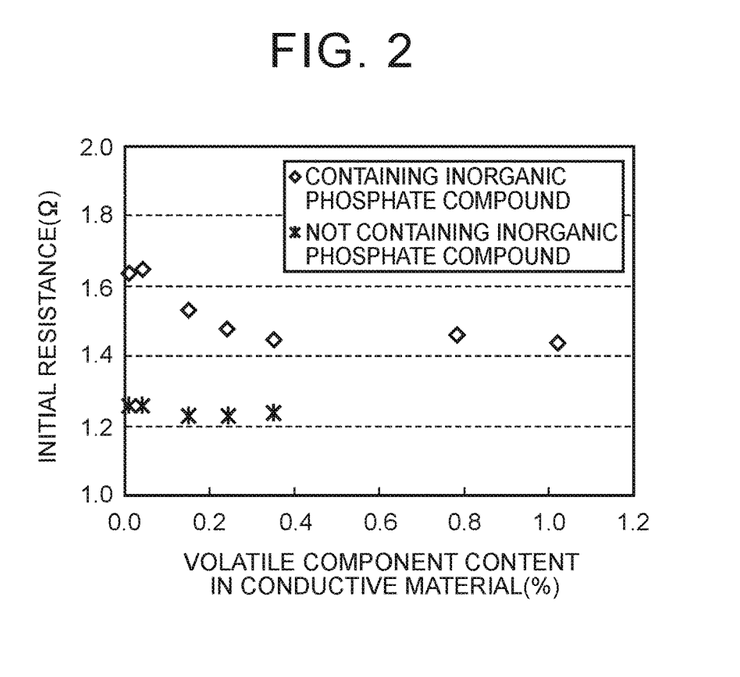
FIG. 2 is a graph showing a relationship between a volatile component content in a conductive material and an initial resistance.

The SOC of the batteries after the conditioning treatment was adjusted to 60% in a temperature environment of 25° C. Each of the batteries was discharged at a constant current (CC) at a rate of 1 C, 3 C, 5 C, or 10 C, and a voltage change (voltage drop) thereof was measured for 10 seconds from the start of the discharge. The measured voltage change amount (V) was divided by the corresponding current value to calculate an IV resistance. Here, the arithmetic mean value of the IV resistance was set as an initial resistance (Ω). The results are shown in Table 1. FIG. 2 is a graph showing a relationship between a volatile component content in a conductive material and an initial resistance.

<High-Temperature Durability Test>

Next, after the initial resistance measurement, the batteries were left to stand in a thermostatic chamber set to a temperature of 60° C. In a temperature environment of 60° C., the following charging and discharging operations (1) and (2) were performed on the batteries in 200 cycles. (1) The batteries were discharged to 4.75 V at a constant current (CC) at a rate of 2 C, and then the operation was stopped for 10 minutes. (2) The batteries were discharged to 3.5 V at a constant current (CC) at a rate of 2 C, and then the operation was stopped for 10 minutes. After completion of the high-temperature durability test, the capacity retention (%) was calculated from a ratio of the CC discharge capacity of the 200th cycle to the CC discharge capacity of the first cycle according to the following expression.

((CC Discharge Capacity of 200th Cycle/CC Discharge Capacity of First Cycle)×100(%))

Figure 3:
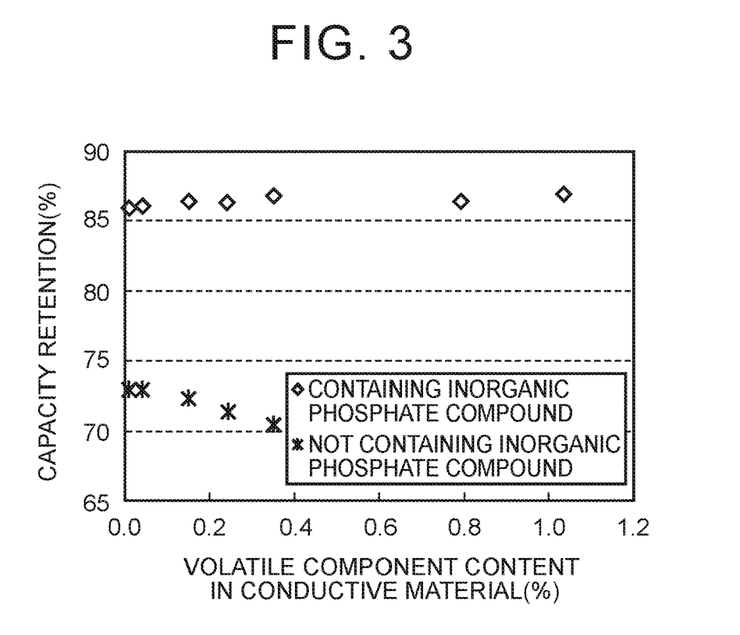
FIG. 3 is a graph showing a relationship between a volatile component content in a conductive material and a capacity retention.

The results are shown in Table 1. FIG. 3 is a graph showing a relationship between a volatile component content in a conductive material and a capacity retention.

TABLE 1

| | $Li_3PO_4$ | | Volatile Component Content** in | | Volatile | | Battery Characteristics | |
| | Content (Part(s) by Mass) | Content Cp* (mass %) | Conductive Material (mass %) | Content (mass %) | Component Content Cv* (mass %) | Cp/Cv | Initial Resistance (Ω) | Capacity Retention (%) |
|---|---|---|---|---|---|---|---|---|
| Reference Example 1 | 3.0 | 2.91 | 0.01 | 8 | 0.001 | 3750 | 1.64 | 86.0 |
| Reference Example 2 | 3.0 | 2.91 | 0.04 | 8 | 0.003 | 938 | 1.65 | 86.1 |
| Example 1 | 3.0 | 2.91 | 0.15 | 8 | 0.012 | 250 | 1.53 | 86.5 |
| Example 2 | 3.0 | 2.91 | 0.24 | 8 | 0.019 | 156 | 1.48 | 86.4 |
| Example 3 | 3.0 | 2.91 | 0.35 | 8 | 0.028 | 107 | 1.45 | 86.8 |
| Example 4 | 3.0 | 2.91 | 0.78 | 8 | 0.062 | 48 | 1.46 | 86.5 |
| Example 5 | 3.0 | 2.91 | 1.02 | 8 | 0.082 | 37 | 1.44 | 87.0 |
| Reference Example 3 | 0 | 0 | 0.01 | 8 | 0.001 | — | 1.26 | 73.0 |
| Reference Example 4 | 0 | 0 | 0.04 | 8 | 0.003 | — | 1.26 | 73.1 |
| Reference Example 5 | 0 | 0 | 0.15 | 8 | 0.012 | — | 1.23 | 72.3 |
| Reference Example 6 | 0 | 0 | 0.24 | 8 | 0.019 | — | 1.23 | 71.4 |

TABLE 1-continued

| | Conductive Material | | | | | Battery Characteristics | |
|---|---|---|---|---|---|---|---|
| | $Li_3PO_4$ | | Volatile Component Content** in Conductive Material (mass %) | Content (mass %) | Volatile Component Content Cv* (mass %) | Cp/Cv | Initial Resistance ($\Omega$) | Capacity Retention (%) |
| | Content (Part(s) by Mass) | Content Cp* (mass %) | | | | | | |
| Reference Example 7 | 0 | 0 | 0.35 | 8 | 0.028 | — | 1.24 | 70.5 |

*Mass ratio to the total solid content of the positive electrode active material layer
**Volatile component content in conductive material which is measured according to JIS K 6221 (1982)

Reference Examples 3 to 7 were test examples for comparing and investigating the effects of a volatile component content in a conductive material in a system in which the positive electrode did not contain $Li_3PO_4$. As can be seen from Table 1 and FIG. 2, in the system not containing $Li_3PO_4$, the initial resistance was suppressed to be low. However, as can be seen from Table 1 and FIG. 3, in the system not containing $Li_3PO_4$, as the volatile component content in the conductive material increased, high-temperature durability (capacity retention) deteriorated. The reason for this is presumed that the volatile component electrochemically reacted (was decomposed). It is presumed that a by-product was produced due to the above-described reaction, which had adverse effects on battery characteristics.

Reference Examples 1 and 2 and Examples 1 to 5 were test examples for comparing and investigating the effects of a volatile component content in a conductive material in a system in which the positive electrode contained $Li_3PO_4$. As can be seen from Table 1 and FIG. 2, in the system containing $Li_3PO_4$, when the volatile component content in the conductive material is a predetermined value or higher, the initial resistance was significantly reduced. In particular, in a case where the volatile component content in acetylene black as the conductive material is 0.15 mass % or higher, preferably 0.24 mass % or higher, and more preferably 0.35 mass % or higher, an effect of reducing the resistance was significant. It is presumed that from the above results that, in the system containing $Li_3PO_4$, the electron conductivity of the positive electrode has a large effect on the battery resistance. It is presumed that, by using the high-volatility conductive material, low electron conductivity of $Li_3PO_4$ can be compensated for, and a good conductive path can be formed in the positive electrode active material layer. As can be seen from Table 1 and FIG. 3, in the systems containing $Li_3PO_4$, the capacity retention exhibited a high value. That is, unlike Reference Examples 3 to 7, a correlation with the volatile component content was not established. The reasons for this are not clear, but one of the reasons is presumed to be that the by-product derived from the volatile component was trapped by $Li_3PO_4$; as a result, capacity deterioration was suppressed.

Figure 4:
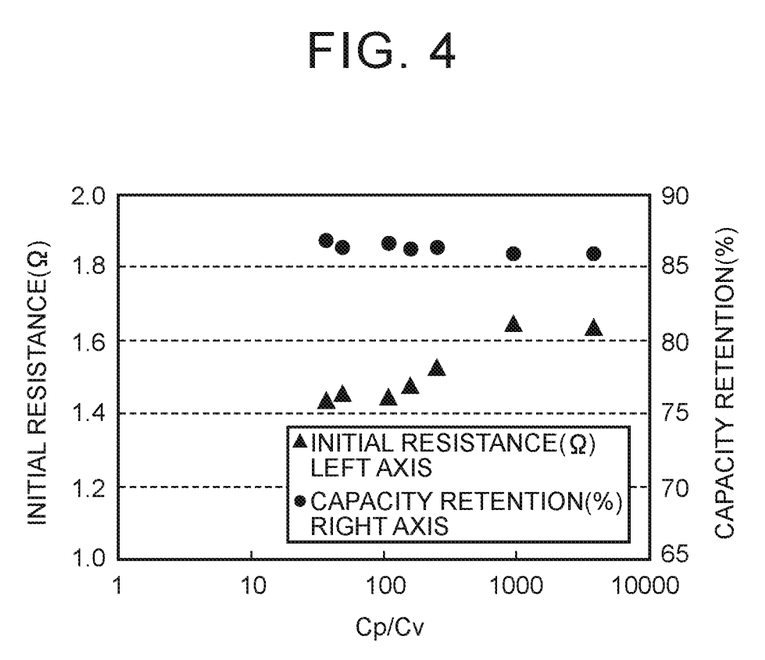
FIG. 4 is a graph showing a relationship between Cp/Cv and battery characteristics (initial resistance and capacity retention).

FIG. 4 is a graph showing a relationship between Cp/Cv and battery characteristics (initial resistance and capacity retention). As can be seen from Table 1 and FIG. 4, when a ratio (Cp/Cv) of the mass ratio Cp of the inorganic phosphate compound to the mass ratio Cv of the volatile component content is about 500 or lower, for example, 30 to 400, the volatile component and the inorganic phosphate compound can be made to be more well-balanced in the conductive material. As a result, the effect of reducing the initial resistance and the effect of improving the durability can be realized at the same time at a high level.

[II. Investigation Relating to Content Ratio of Inorganic Phosphate Compound]

Lithium ion secondary batteries of Examples 6 and 7 were constructed using the same method as in Example 3, except that the mass ratio of $Li_3PO_4$ was changed as shown in Table 2. Lithium ion secondary batteries of Reference Examples 8 and 9 were constructed using the same method as in Reference Example 1, except that the mass ratio of $Li_3PO_4$ was changed as shown in Table 2. Using the same method as in Example 3 and Reference Example 3, the initial resistance measurement and the high-temperature durability test were performed. The results are shown in Table 2.

TABLE 2

| | Conductive Material | | | | | | Battery Characteristics | |
|---|---|---|---|---|---|---|---|---|
| | $Li_3PO_4$ | | Volatile Component Content** in Conductive Material (mass %) | Content (mass %) | Volatile Component Content Cv* (mass %) | Cp/Cv | Initial Resistance ($\Omega$) | Capacity Retention (%) |
| | Content (Part(s) by Mass) | Content Cp* (mass %) | | | | | | |
| Reference Example 7 | 0 | 0 | 0.35 | 8 | 0.028 | — | 1.24 | 70.5 |
| Example 6 | 1 | 0.99 | 0.35 | 8 | 0.028 | 36 | 1.4 | 82.8 |
| Example 3 | 3 | 2.91 | 0.35 | 8 | 0.028 | 107 | 1.45 | 86.8 |
| Example 7 | 10 | 9.09 | 0.35 | 8 | 0.028 | 357 | 1.49 | 85.0 |
| Reference Example 3 | 0 | 0 | 0.01 | 8 | 0.001 | — | 1.26 | 73.0 |
| Reference Example 8 | 1 | 0.99 | 0.01 | 8 | 0.001 | 1250 | 1.58 | 83.0 |

TABLE 2-continued

| | Li₃PO₄ | | Conductive Material | | Volatile | | Battery Characteristics | |
|---|---|---|---|---|---|---|---|---|
| | Content (Part(s) by Mass) | Content Cp* (mass %) | Volatile Component Content** in Conductive Material (mass %) | Content (mass %) | Volatile Component Content Cv* (mass %) | Cp/Cv | Initial Resistance (Ω) | Capacity Retention (%) |
| Reference Example 1 | 3 | 2.91 | 0.01 | 8 | 0.001 | 3750 | 1.64 | 86.0 |
| Reference Example 9 | 10 | 9.09 | 0.01 | 8 | 0.001 | 12500 | 1.62 | 85.1 |

*Mass ratio to the total solid content of the positive electrode active material layer
**Volatile component content in conductive material which is measured according to JIS K 6221 (1982)

Reference Example 7 and Examples 6, 3, and 7 were test examples containing a conductive material having a volatile component content of 0.15 mass % or higher (high-volatility conductive material). Reference Example 3, 8, 1, and 9 were test examples containing a conductive material having a volatile component content of lower than 0.15 mass % (low-volatility conductive material). As can be seen from Table 2, the capacity retentions of Examples 6, 3, and 7 and Reference Examples 8, 1, and 9 containing Li₃PO₄ were higher than those of Reference Examples 7 and 3 not containing Li₃PO₄. When the test examples containing the high-volatility conductive material are compared to the test examples containing the low-volatility conductive material, the initial resistances of the test examples containing the high-volatility conductive material were suppressed to be relatively low. As can be seen from the results of Reference Example 7 and Examples 6, 3, and 7, when the Li₃PO₄ content is in a range of 1 part by mass to 10 parts by mass with respect to 100 parts by mass of the positive electrode active material, the effect of improving the durability and the effect of reducing the initial resistance can be made to be more well-balanced.

Hereinabove, the invention has been described in detail, but the above-described embodiment and examples are merely exemplary. The invention disclosed herein includes various modifications and alternations of the above-described specific examples.

What is claimed is:

1. A nonaqueous electrolyte secondary battery comprising:
   a positive electrode;
   a negative electrode; and
   a nonaqueous electrolytic solution, wherein
   the positive electrode includes a positive electrode current collector and a positive electrode active material layer that is formed on the positive electrode current collector,
   the positive electrode active material layer contains a positive electrode active material, an inorganic phosphate compound having ion conductivity, and a conductive material, and
   a volatile component content in the conductive material is 0.15 mass % to 0.78 mass %,
   wherein in a case where a mass ratio of the volatile component content to a total solid content of the positive electrode active material layer is represented by Cv, and in a case where a mass ratio of a content of the inorganic phosphate compound to the total solid content of the positive electrode active material layer is represented by Cp, a ratio of Cp to Cv is 36 to 357.

2. The nonaqueous electrolyte secondary battery according to claim 1, wherein a content of the inorganic phosphate compound to 100 parts by mass of the positive electrode active material is 1 part by mass to 10 parts by mass.

3. The nonaqueous electrolyte secondary battery according to claim 1, wherein
   the volatile component is a functional group component provided on a surface of the conductive material, and
   the functional group component is a hydrophilic functional group or a polar group.

4. The nonaqueous electrolyte secondary battery according to claim 1, wherein the volatile component content in the conductive material is at least 0.24 mass %.

5. The nonaqueous electrolyte secondary battery according to claim 1, wherein the volatile component content in the conductive material is at least 0.35 mass %.

* * * * *